Figure 1:
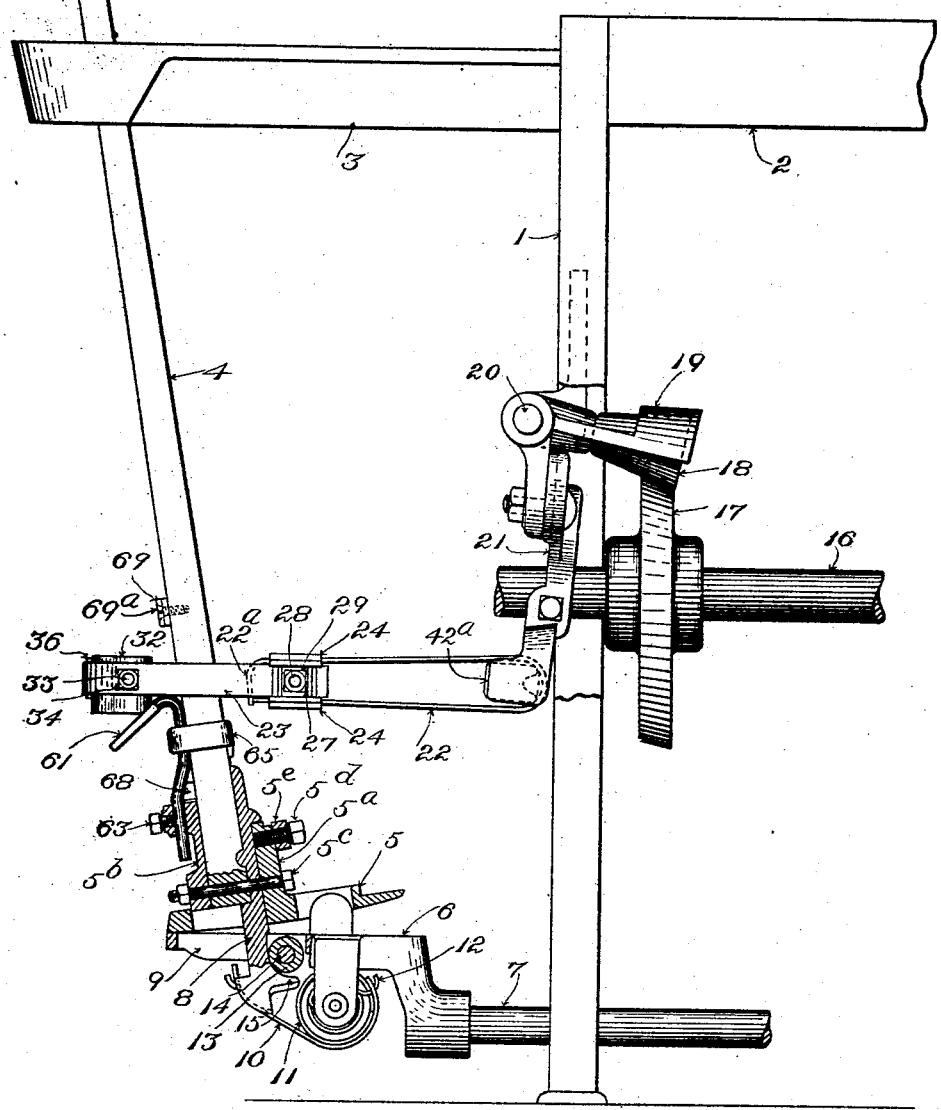

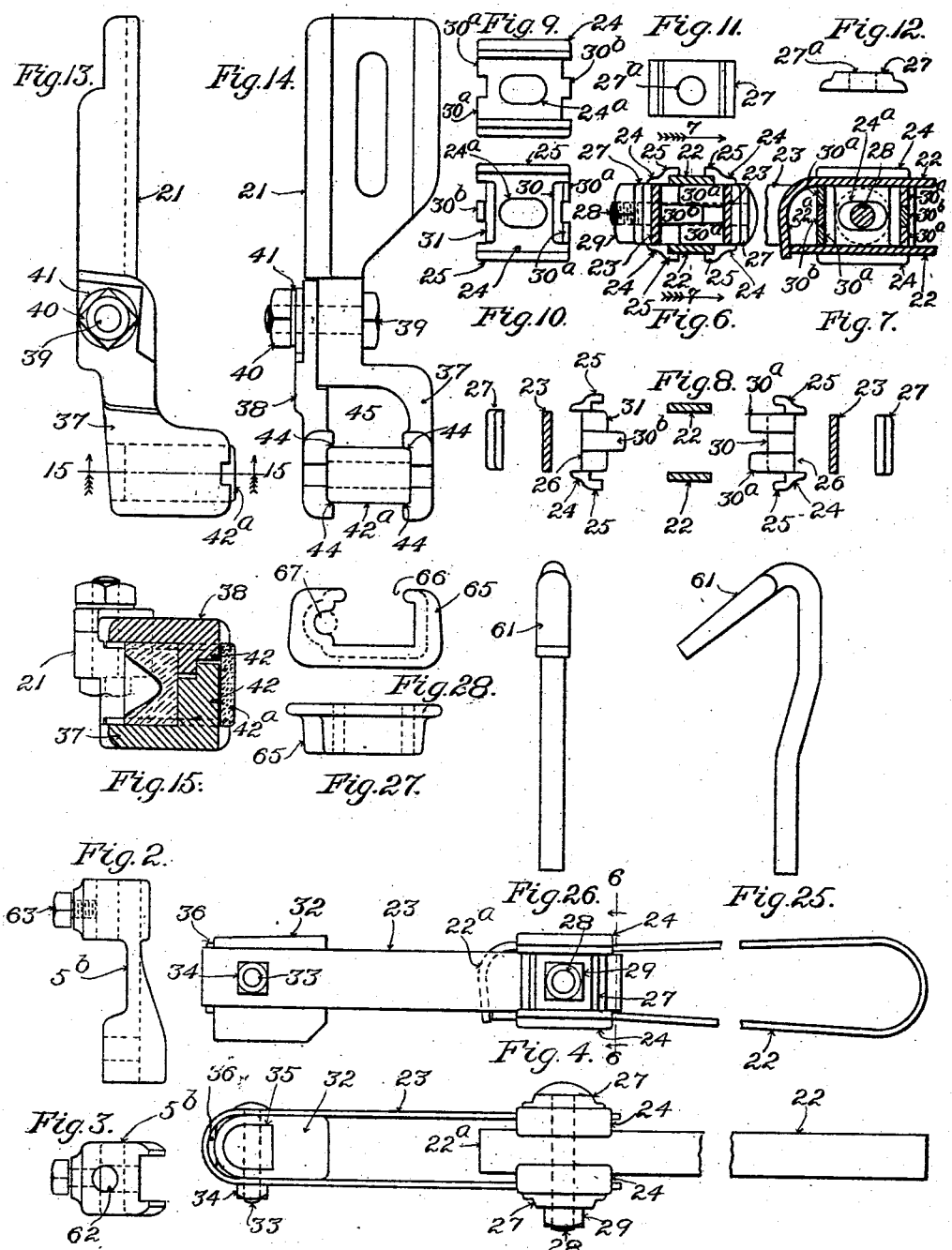

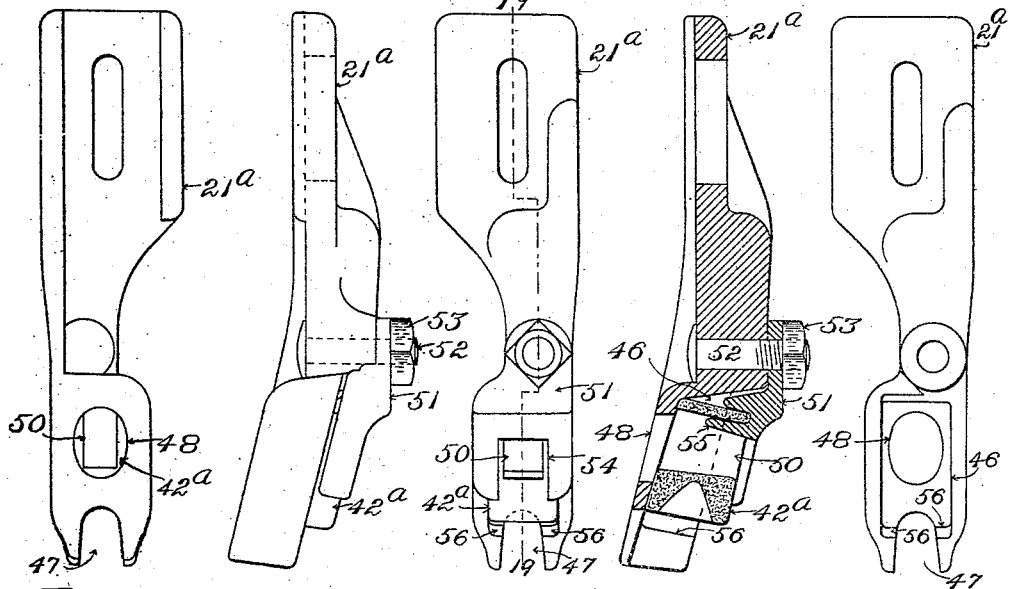
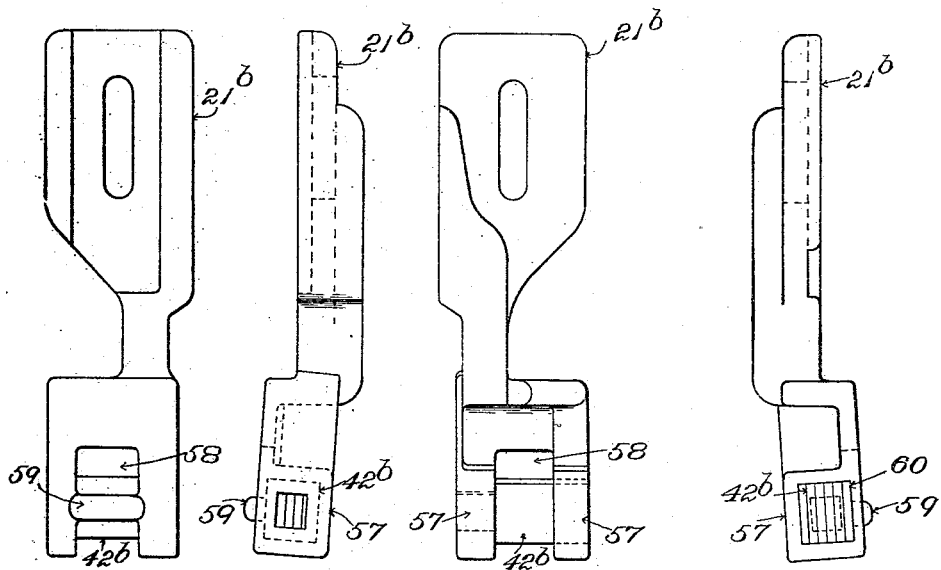

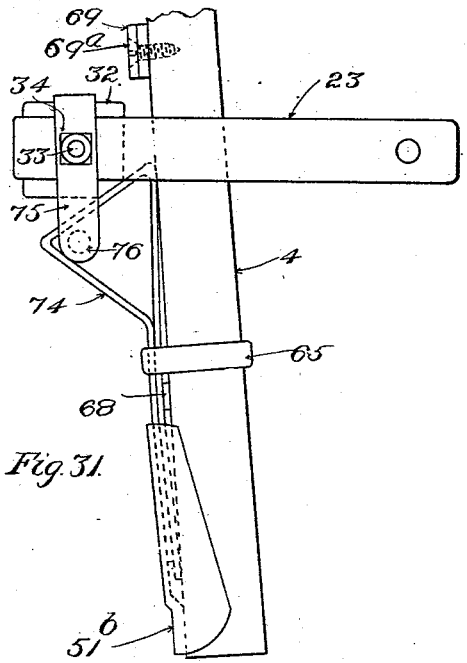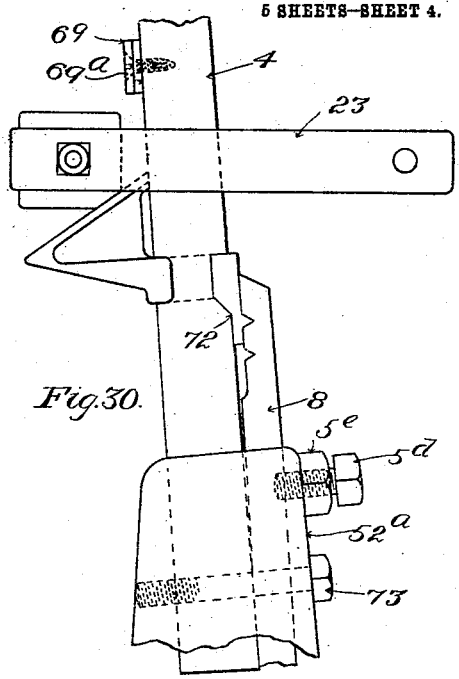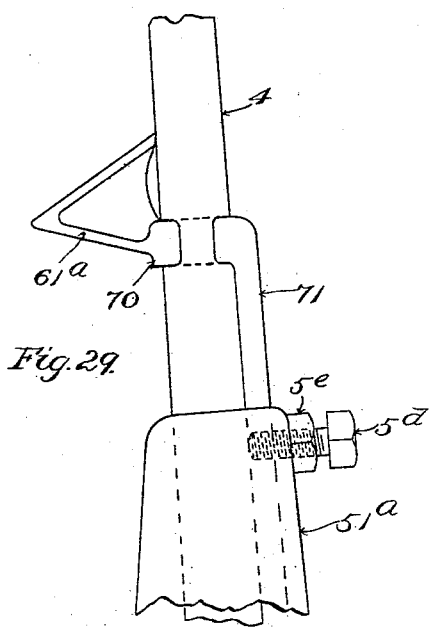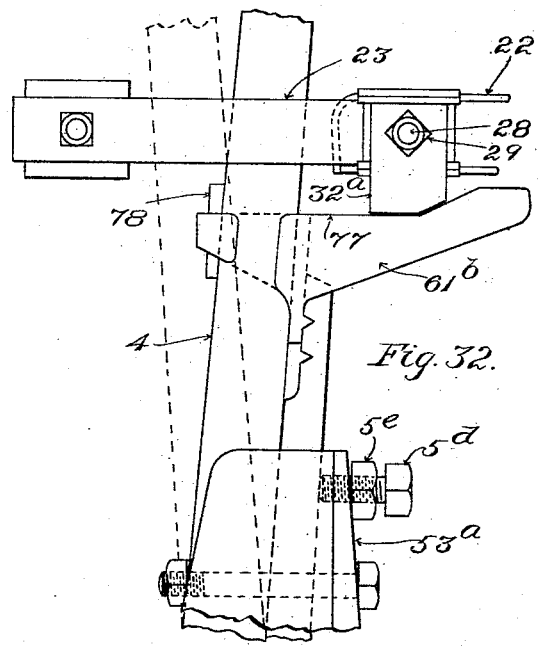

C. A. LITTLEFIELD, DEC'D.
A. LITTLEFIELD, ADMINISTRATOR.
LOOM.
APPLICATION FILED SEPT. 6, 1910.
1,135,969.
Patented Apr. 13, 1915.
5 SHEETS—SHEET 5.
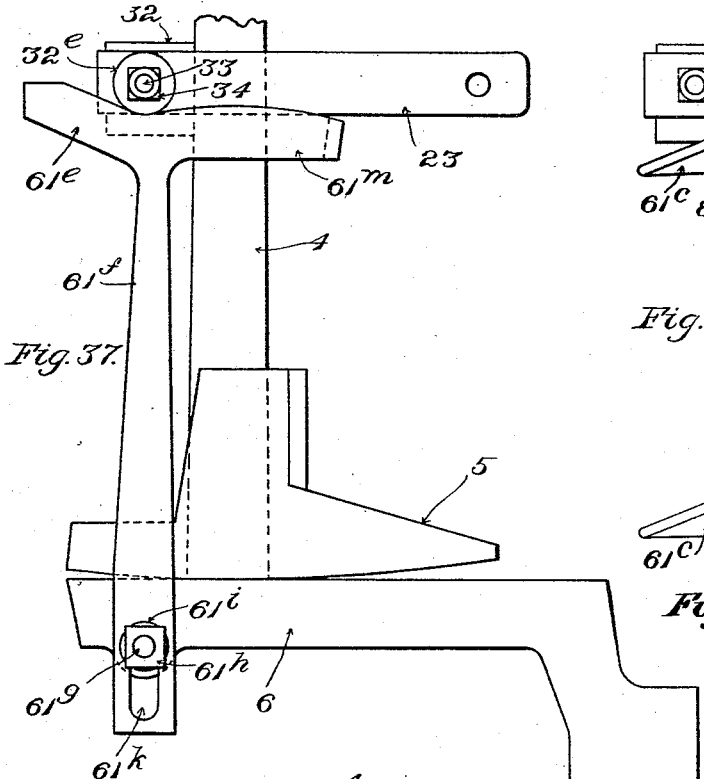
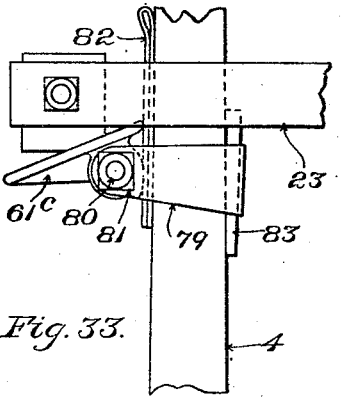
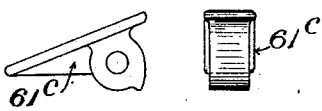
Fig. 34.  Fig. 35.
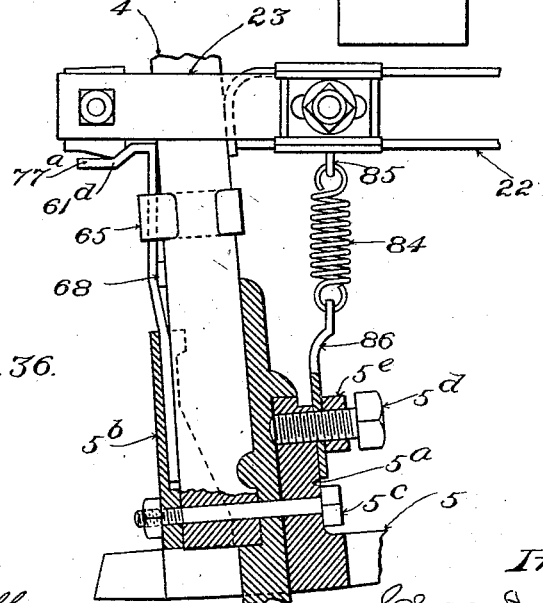
Witnesses:
Oscar F. Hill
Ellen O. Spring
Inventor:
Chas. A. Littlefield
by Chas. F. Randall
Attorney.

UNITED STATES PATENT OFFICE.

CHARLES A. LITTLEFIELD, OF LOWELL, MASSACHUSETTS; ARTHUR LITTLEFIELD, ADMINISTRATOR OF SAID CHARLES A. LITTLEFIELD, DECEASED, ASSIGNOR OF ONE-HALF TO EPHRAIM H. SPEDDING, OF LOWELL, MASSACHUSETTS.

LOOM.

1,135,969.  Specification of Letters Patent.  Patented Apr. 13, 1915.

Application filed September 6, 1910. Serial No. 580,559.

*To all whom it may concern:*

Be it known that I, CHARLES A. LITTLEFIELD, a citizen of the United States, residing at Lowell, in the county of Middlesex, State of Massachusetts, have invented a certain new and useful Improvement in Looms, of which the following is a specification, reference being had therein to the accompanying drawings.

The invention has relation to the devices which are employed for throwing the shuttle in a loom, and for checking it as it completes its entrance into the shuttle-box at the end of a flight.

The invention comprises an improved construction of lug-strap; an improved construction of picking-arm, and cushion intermediate such arm and the lug-strap; and novel means coöperating with the lug-strap to check the shuttle at the end of its flight.

The improved lug-strap comprises opposite loops, one thereof for engagement with the picking-arm and the other with the picker-stick, said loops disposed in planes at right angles to each other, and clamp-members receiving on four sides thereof the said free ends and coupling the loops together. In the preferred embodiment of this portion of the invention, the clamp-members clasp the free ends of one loop edgewise between them, and the free ends of the other loop are clamped flatwise to the said clamp-members. The construction provides for adjustment by which the effective length of the lug-strap is varied.

I provide the picking-arm with a socket or holder, within which I place a block or pad of material softer than iron. The said block or pad is encircled by a loop at the inner end of the lug-strap, and its use obviates the wear which otherwise would be received by the metal parts of the picking-arm and lug-strap if they were in contact during operation.

Various special features are embodied in the construction of the picking-arm and its socket or holder, and in the combination of the block or pad therewith. One aim, in particular, in this connection, is to enable old loom-pickers to be utilized to great advantage.

One characteristic of the shuttle-checking features of the invention is the employment of means intermediate the lug-strap and the picker-stick for absorbing the energy transmitted to the latter by the shuttle.

Another is the employment of members in connection, respectively, with the picker-stick and lug-strap, and offering frictional resistance to the shuttle-imparted movement of the picker-stick.

Another is that the vertically-acting weight of the lug-strap opposes the shuttle-imparted outward movement of the picker-stick.

Another is the employment of a device through which the energy of the shuttle is absorbed in the work of lifting the lug-strap. In the preferred embodiment of this portion of the invention I employ an incline and a contact-member, one thereof moving with the picker-stick and the other connected with the lug-strap, the weight of the lug-strap holding them in contact and shuttle-imparted movement of the picker-stick producing relative movement of said members lengthwise of the incline, and such relative movement operating to lift the lug-strap.

The drawings illustrate embodiments of the features of the invention.

Figure 1 shows a portion of one side of a loom-frame with embodiments of the said features applied thereto, certain portions being broken out or in section. Fig. 2, Sheet 2, shows in front elevation, detached, the removable clamp-piece for the foot-end of the picker-stick, and Fig. 3 is a top-view thereof. Fig. 4, Sheet 2, is a front elevation of the lug-strap, on an enlarged scale, and Fig. 5 is a top-view thereof. Fig. 6 is a view in cross-section in the plane of line 6, 6, of Fig. 4, and Fig. 7 is a view in section in the plane of line 7, 7, of Fig. 6. Fig. 8 shows the parts of Fig. 6 separated from one another, but retaining the same relative positions as in Fig. 6. Figs. 9 and 10 are back and face views of one of the clamp-members of the lug-strap. Figs. 11 and 12 are back and edge views of one of the washer-plates of the lug-strap. Fig. 13 is a view of the adjustable part of the picking-arm of Fig. 1, showing it detached and from the rear in Fig. 1, and Fig. 14 is a view thereof looking from the outer side in Fig. 1. Fig. 15 is a view in horizontal section on line 15, 15, of Fig. 13. Fig. 16, Sheet 3, shows a picking-arm with modified socket and cushion or pad, viewing the outer side of the said arm; Fig. 17, shows the same in front elevation; Fig. 18 is a side elevation viewing the inner side of the arm; Fig. 19 is a view in section in the plane of line 19, 19, of Fig. 18; and Fig. 20 is a view of the picking-arm, looking at the inner side thereof, with the cover for the socket, and the cushion or pad, removed. Fig. 21, Sheet 3, shows another construction of picking-arm and cushion or pad, viewed from the outer side thereof; Fig. 22 shows the same viewed from the front; Fig. 23 shows the same viewed from the inner side thereof; and Fig. 24 shows the same viewed from the rear. Fig. 25, Sheet 2, shows the incline-piece of Fig. 1 in front elevation, detached, on an enlarged scale, and Fig. 26 is a view of the same from the left in Fig. 1. Fig. 27, Sheet 2, is a front elevation, and Fig. 28 a plan view of the collar which holds the stem of the incline-piece firmly clasped to the picker-stick. Figs. 29, 30, 31 and 32, of Sheet 4, and Figs. 33, 34, 35, 36 and 37 of Sheet 5, show other forms of embodiment of the checking-devices.

In Fig. 1 the loom side-frame which is shown therein is marked 1, and the breast-beam 2, the outwardly-projecting end-portion of the lay whereon in practice is located one of the shuttle-boxes being marked 3.

4 is the picker-stick which works in such shuttle-box, 5 its supporting shoe or rocker, 6 the rocker-bed, and 7 the lay rockshaft on one end of which the rocker-bed is fixed.

8 is the tongue which projects downward from the shoe or rocker through the slot 9 in the rocker-bed. The said tongue is constituted by the lower portion of a strip or bar, the upper portion of which is fitted between the foot-portion of the picker-stick and the upright portion of the socket 5ᵃ of the shoe or rocker. The said strip or bar is formed with a projection which enters a notch in the inner edge of the picker-stick to assist in preventing longitudinal displacement of the picker-stick. The picker-stick and strip or bar are secured in place by a clamp-piece 5ᵇ, Figs. 1, 2, 3, which fits the outer edge of the picker-stick, and the bolt 5ᶜ passing through the clamp-piece, the picker-stick, the upper portion of said strip or bar, and the said upright portion of the socket of the rocker or shoe.

5ᵈ is an adjusting-screw working in a threaded hole tapped in the upright portion of the socket of the rocker or shoe and making contact by its inner end with the strip or bar. By turning the said adjusting-screw the inclination of the picker-stick may be varied as required.

5ᵉ is a lock-nut on the adjusting-screw, to prevent accidental loss of adjustment.

10 is the heel-strap, it having one end thereof engaged with the lower end of the said tongue 8.

11 is the drum or barrel on which such strap winds.

12 is the heel-strap spring, it actuating the said drum or barrel with a tendency to wind up the slack in the heel-strap and swing the picker-stick outward into its normal position shown in Fig. 1 and keep it there.

13 is the roll, or rolls, against which the inner edge of the tongue 8 works, and 14 is the supporting stud for the said roll, or rolls, mounted in the rocker-bed and extending across the slot therein.

15 is the hook formed on said tongue and engaging with the said roll or rolls to prevent the picker-stick from jumping. The cam-shaft of the loom is marked 16, and one of the picking tappets thereon is shown at 17. The cone-shaped roll against which such tappet acts is marked 18, 19 being the arm which carries the said cone-shaped roll or cone, and 20 the picking rockshaft on which the said arm is fixed.

As thus far referred to the parts are old, and save, with respect of the tongue of the shoe or rocker and the roll or rolls with which it engages, do not embody any of the features of the invention.

At 21 is the picking-arm with which the inner portion of the lug-strap is engaged, such arm being fixedly connected with the picking-rockshaft 20 as usual, in manner providing for adjustment of the effective length of the picking-arm.

For the purpose of reducing the wear I employ a chilled roll or rolls, 13, for a bearing for the tongue 8 of the rocker or shoe of the picker-stick, and the surface of tongue 8 and hook 15 making contact with the said roll or rolls is chilled also.

The lug-strap is shown in place in the loom, and separately and in detail in Figs. 4 to 12. It is constructed of two loops, 22 and 23, of suitable material, extending oppositely with relation to each other, and clamping devices by which the two loops are connected together at their open ends; and in some cases a pad or cushion is provided in the bend or bight of one of the said loops for contact with the outer edge of the picker-stick. The material of which the loops are composed may be metal, as iron, or may be non-metallic, as leather. Various other metallic and non-metallic substances are suitable as the material of which the loops may be composed, and the invention is not restricted to iron or any other particular material. The loops preferably are composed of material in strip-form, but may be of material of other shape in some cases. The two loops engage, respectively, with the picking-arm 21 and the picker-stick 4. The loop which engages with the picking-arm receives in its bend or bight a part in connection with the picking-arm; the other loop embraces the picker-stick. The two loops are in planes at right angles to each other, so that when the lug-strap is applied to a loom the loop which embraces the upright picker-stick occupies a horizontal or substantially horizontal plane, while the other loop occupies a vertical or substantially vertical plane, the part in connection with the picking-arm which it embraces occupying a horizontal or substantially horizontal position. The open ends of the two loops, disposed in planes at right angles to each other as aforesaid, are juxtaposed and engaged with the clamp-members, the lengths of the loops being sufficient to provide for extension by adjustment within the clamps and relative to each other to the maximum required length of lug-strap.

The clamping devices comprise two opposing clamp-members 24, 24, which receive the two end-portions of one loop, as 22, edgewise between them, the said members having longitudinal flanges 25, 25, which lie alongside the said end-portions and prevent them from slipping transversely out of the grasp of the clamp-members. The backs of the clamp-members have formed therein grooves 26, 26, which receive the two end-portions of the other loop, in this case the loop 23, which lie flatwise therein. Washer-plates 27, 27, lie against the outer surfaces of the end-portions in said grooves. A securing bolt 28 passes through holes 27ª in the washer-plates and also through holes in the loop-end-portions which occupy the grooves, and through slots 24ª, 24ª, in the clamp-members. The bolt receives a nut 29 on its threaded portion. By tightening up the bolt and nut, the end-portions last mentioned are clamped tightly in the grooves, and the end-portions between the clamp-members are clasped securely edgewise between the latter. Thereby the parts of the lug-strap are secured together in working relations and condition.

For the purpose of effecting adjustments of the effective length of the lug-strap, the bolt and nut are loosened, and the end-portions of loop 22 are shifted lengthwise between the clamp-members, in addition to which the end-portions of loop 23 may be shifted lengthwise within the grooves of the clamp-members within the limits of the movement permitted the bolt lengthwise of the slots in the clamp-members. The shift or adjustment of loop 22 relative to the clamp-members will usually afford all the capacity for adjustment of the length of the lug-strap that is required, so that in some cases the bolt-openings in the clamp-members need not be elongated. To engage the clamp-members with each other so as to prevent them from becoming displaced relative to each other, each clamp-member is formed with lips 30, 31, at its opposite ends, such lips projecting from its inner side. The lip 30 at one end of the clamp member has a separated pair of ribs 30ª, 30ª, which are continued in the form of lugs projecting past the edge of the lip, and the lip 31 at the other end has a single rib 30 and extension or lug. In fitting the clamp-members together they are reversely disposed with relation to each other so that the end of each having the single rib and lug shall be presented to the end of the other having the pair of ribs and lugs, and the single rib and lug is entered between the pair of ribs and lugs. Thereby displacement of the clamp members edgewise with relation to each other is prevented. The lugs at the opposite ends of each member overlap the outer faces of the lips of the other member. Thereby the clamp-members are prevented from displacement lengthwise relative to each other. The interlapping ends of the loops 22, 23, are held by frictional engagement of the clamping devices therewith in the described construction. There is not the tendency to wear which would exist if the loops were secured to the connecting members only by bolts.

It will be observed that only a single bolt and nut are employed in the construction of the lug-strap, and that only this bolt and nut require to be loosened and tightened in assembling the lug-strap and adjusting its working length.

To prevent injury to the picker-stick by contact of the extremities of the side-portions of loop 22 therewith, one of such extremities is left longer than the other and is bent vertically, as at 22ª, so as to lie across the opposite extremity, covering and concealing the latter and presenting the smooth outer surface of the bent extremity toward the picker-stick.

The cushion or pad which is employed in the bend or bight of the outer loop 23 of the lug-strap for contact with the outer edge of the picker-stick is marked 32 in Figs. 1, 4 and 5. It is secured in place by a bolt 33 which passes transversely through holes in the sides of the said loop and in the cushion or pad, and has a nut 34 applied to its threaded end outside the corresponding side of the loop. For reasons of economy I employ for the cushion or pad a worn loom-picker of the well-known loop form. In order to utilize the entire picker and enable all the substance thereof to be utilized for cushioning purposes, I fill the eye of the loop with a plug 35, Fig. 5, which may be either a block of wood or a metal casting. The bolt which fastens the picker in place within loop 23 of the lug-strap passes through the loop-portion of the picker and also through this plug. In order that the strain due to the picking action may not take effect on the picker at the points where the bolt passes through the loop thereof, a wedge 36 of wood or other suitable material is driven in between the outer end of the loop and the bend at the outer end of the lug-strap so as to fill the space or interval snugly and tightly. The result is a solid structure in which the strain due to the picking action is transmitted through the solid part of the picker, the plug, the outer thickness of the loop, and the filling-piece to the bend at the outer end of the lug-strap, and is taken off the bolt and the part of loop 23 through which such bolt passes. By causing the securing bolt to pass through the loop of the picker and the plug I am enabled to utilize the entire substance of the body-portion of the picker as a cushion between the plug and the picker stick.

The construction of the picking-arm and its socket or holder for the cushion that is applied thereto in accordance with my invention, and the form and material of the cushion, may vary. Reference will be made first to the parts as they are shown in place in the loom in Fig. 1, and detached in Figs. 13, 14 and 15. Only the detachable adjustable part of the picking-arm is represented in the latter figures. The socket or holder for the cushion 42ª is at the lower end of the said part. The said socket or holder comprises a fixed wall 37 and a detachable wall 38, the two walls being opposite each other and separated by a space designed to receive the cushion or pad and the upper side of the lug-strap loop 22 which embraces the said cushion or pad. For convenience in applying and removing the cushion or pad, the detachable wall is removably secured in place upon the picking-arm by means of a bolt 39 which passes through holes in the shanks of the said wall and arm above the said space, and a nut 40 and washer 41 applied to the said bolt. The socket or holder is constructed to support the cushion or pad 42ª and securely hold it in place during operation. The opposite walls are provided with projections 42, 42, Fig. 15, extending toward each other and shaped to form a stepped overlapping joint having vertical faces which make contact with each other to cause such projections to properly register with each other, while permitting the walls to be separated more or less by cushions or pads of different sizes. The cushion or pad has a hole which extends transversely therethrough and which receives the said projections. The projections sustain the cushion or pad against the resistance which it encounters from the surrounding loop of the lug-strap when the picking-arm is swung inward through the action of the picking rockshaft. Recesses are formed in the two walls to receive the front and rear sides of the cushion or pad, the shoulders 44, 44, at the tops and bottoms of these recesses preventing or limiting swinging or other vertical displacement of the cushion or pad between the walls.

The cushion or pad 42ª in connection with the picking-arm serves as a buffer between the said arm and the bend or bight at the inner end of the lug-strap. The upper portion of the said bend or bight occupies the opening 45 above the cushion or pad, and when the lug-strap swings loosely it rests upon the top surface of the cushion or pad. When the picking action takes place, the contact and pressure occur against the inner end of the cushion or pad. The employment of the cushion or pad obviates wear between the picking-arm and the lug-strap.

The construction of socket or holder shown in Figs. 1, 13, 14 and 15 is especially adapted to receive and employ as a cushion or pad a loom-picker of the kind known as a loop-picker. The eye of the loop thereof constitutes the hole or opening which receives the projections extending toward each other from the two walls, and the outer portion of the loop itself of the picker intervenes between the said projections and the embracing lug-strap loop. I am thereby enabled to utilize the loop-pickers which have served their purpose as pickers in looms until they have become too far worn for further use in that service, with a very considerable economy and saving in the cost of maintaining and operating looms. In the said construction the picker occupies a horizontal position, its loop being turned toward the middle of the loom to serve as the cushion, its striking part containing the cavity worn by contact with shuttle-tips being turned outward.

The picking-arm 21ª shown in Figs. 16, 17, 18, 19 and 20 has a vertical pocket 46 opening at the side of such arm which is turned toward the middle of the loom. The lower end of the picking-arm has an open-bottomed slot 47 therein communicating with the said pocket, and above the said slot a hole 48 is made through the outer wall of the picking-arm, such hole communicating with the upper portion of the pocket. The cushion or pad 42ª occupies the said pocket. The hole 50 through the upper portion of the cushion or pad registers with the hole 48 in the said outer wall. The upper side-portion of the loop 22 of the lug-strap is in practice caused to occupy the said registering holes, and the lower side-portion of the said loop occupies the slot. The bottom of the hole 48 in the outer side-wall of the picking arm is lower down than the bottom of the hole through the cushion or pad, as shown in Fig. 19. Consequently the upper side-portion of the said loop of the lug-strap rests upon the bottom of the hole in the cushion or pad, without contacting with the bottom edge of the hole in the picking-arm. The said hole 48 in the picking-arm is wider horizontally than the hole through the cushion or pad, as shown in Fig. 16, and consequently the edges of the said upper portion of the loop of the lug-strap are prevented from contacting with the side-walls of the hole in the picking-arm. The closed end or bight of the inner loop of the lug-strap tends to hold the cushion or pad within the chamber in the picking-arm, and the pressure in picking tends to force the cushion or pad more securely home within the said chamber. Special means of holding the cushion or pad in place within the chamber may in some cases be employed.

I provide for use, when desired, a cover 51 which is secured over the upper portion of the chamber by a bolt 52 and nut 53, the lower portion of said cover having a slot 54 which registers with the holes through the picking-arm and cushion or pad, which slot is designed to accommodate the upper portion of the inner loop of the lug-strap. The said slot is wider horizontally than the hole through the cushion or pad, so that there is no contact between the edges of the loop of the lug-strap and the side-walls of the said hole. The cover is provided with a projection 55 which extends into the hole 50 through the cushion or pad, and by engagement with the interior of the cushion or pad at the top of the said hole affords support to the cushion or pad vertically. The side-walls of the chamber in the picking-arm are formed with interior shoulders 56, 56, below the lower end of the cushion or pad. These shoulders will support the cushion or pad vertically when the cover is removed, or in case the projection above described as provided on the cover is broken off or otherwise removed, or is omitted.

The construction just described with reference to Figs. 16 to 20 is particularly well adapted for the utilization of worn loop-pickers.

Figs. 21, 22, 23 and 24 show a picking-arm 21ᵇ having at its lower end two sockets 57, 57, side by side, but separated by a space 58 sufficiently wide to receive the inner loop of the lug-strap. The opening between the said sockets above the sockets forms a passage for the upper portion of the said loop. It is bridged about mid-height of the sockets by a cross-bar 59 to secure the necessary strength. In the said sockets is contained a cushion or pad 42ᵇ consisting, for instance, of a block of leather, which may be provided by cutting down an old picker to the required form. The said block is introduced into the sockets through a hole 60, Fig. 24, in the outer side of one of the sockets, the outer side of the opposite socket being partly closed as shown in Fig. 22, to prevent the block from passing entirely through. This construction is designed more especially to be used in those establishments which do not employ loom-pickers of the loop-construction previously referred to herein.

One embodiment of the shuttle-checking features of the invention is shown applied in connection with the related parts of a loom in Fig. 1, and certain details thereof are shown separately in Figs. 2, 3, 25 and 26. In this instance the incline is fixedly combined with the picker-stick, and the contact-piece is combined with the lug-strap, although this is not essential in the case of all the forms of embodiment of this portion of the invention. The said incline is shown at 61 combined with the picker-stick in Fig. 1 and separately in Figs. 25 and 26. The acting surface of the incline-piece is outwardly and downwardly inclined. The contact-piece is here constituted by the cushion or pad 32 occupying the bend or bight of the outer loop, 23, of the lug-strap. As previously described, the said cushion or pad preferably is a worn-out picker, although this is not indispensable, inasmuch as the contact-piece may be otherwise constituted. The leather or hide of which pickers usually are made affords a desirable character of engagement with the incline. The lower inner corner of the cushion or pad is beveled off to produce a surface suitable to fit against the incline. The incline-piece is provided with a down-turned stem, the lower portion of which is received within a socket 62, formed in the clamp-piece 5ᵇ, as shown in Figs. 1, 2 and 3, and secured therein by means of a clamping-screw 63. The straight lower portion of the stem is of sufficient length to provide for an ample range of adjustment of the incline up and down. The incline-piece serves the additional function of a support for the outer portion of the lug-strap, by which the height of the said portion with relation to the picker-stick is determined. By adjustment of the incline-piece up or down, the height at which the lug-strap engages with the picker-stick may be varied as may be required in regulating the picking-action. To hold the incline-piece fixedly in place relatively to the picker-stick, and prevent springing of its stem and vibration of the incline, a collar 65 is arranged to engage with the upper portions of the said stem and hold such portion firmly. This collar is shown in place upon the picker-stick in Fig. 1, and separately in Figs. 27 and 28, Sheet 2. It fits around the picker-stick and the said stem-portion and binds the two tightly together. To facilitate the application of the collar it is made with an opening 66, Fig. 28, at one side of sufficiently large dimensions to permit the upper portion of the tapering picker-stick, just below the lay-beam, to pass therethrough.

In applying the collar it is slipped transversely upon the said upper portion of the picker-stick. The stem of the incline-piece is then passed down through the collar, between one end of the latter and the picker-stick, being received in the notch 67, Fig. 28, which is formed within such end of the collar. The collar and incline-piece are passed down along the picker-stick together, until the stem of the incline-piece has been inserted into the socket 62 of the clamp-piece 5ᵇ, and the incline has been located at the required height, and the clamping-screw 63 is then tightened up to securely hold the incline-piece in place. Then the collar 65 is forced down separately until it becomes wedged tightly and cannot descend any farther. Below the collar 65 a block 68, Fig. 1 of leather or other suitable material is clamped between the stem of the incline-piece and the back edge of the picker-stick. This block is for the purpose of absorbing vibration and thereby preventing crystallization of the metal of the stem, and consequent liability to breakage.

In the operation of the loom, after the picker-stick has delivered a pick it is returned by the action of spring 12 toward the outer end of the shuttle-box in which it works, and during the absence of the shuttle from the said shuttle-box it normally occupies a position corresponding with that in which it is represented in Fig. 1. In such position it is a short distance from the extreme outer end of the shuttle-box. At this time the cone 18 rests upon the disk-portion of the picking-tappet, and the picking-arm is in its outer position, the lug-strap also being outward with the cushion or pad resting upon the incline at some point below the top of the latter. The width of the incline is less than the thickness of the picker-stick and less than the width of the space between the side-portions of loop 23 of the lug-strap, so that the incline may pass up into such space without any metallic contact between the incline or its stem and the sides of the said loop. As the shuttle completes its entrance into the shuttle-box at the end of its return flight from the other side of the loom, its leading end drives the picker-stick outward ahead of it. The outward movement of the picker-stick thereby occasioned causes the incline to move outward relative to the contact-piece 32 carried by the outer end of the lug-strap. The outward movement of the cam-piece causes its inclined surface to press upward against the contact-piece so that the resistance due to lifting the weight of the lug-strap, and to the frictional engagement of the two contacting surfaces, such engagement being increased by the said weight, operates with a tendency to retard and check the movement of the picker-stick and consequently of the shuttle.

In Figs. 1, 25 and 26, the incline is a part of a bar which is sufficiently stiff to hold its shape under ordinary conditions of use, and is capable of being properly bent when required. The checking action may be varied by bending the device at its upper end so as to vary the inclination by increasing or decreasing the degree thereof. The greater the inclination, the greater the checking action; the less the inclination, the less the checking action.

A suitable stop or controlling device is employed for the purpose of preventing the lug-strap from jumping upward away from the cam-piece. This stop or controlling device may be variously constituted and applied. In Fig. 1 it consists of a small block 69, of leather, fastened by a screw 69ᵃ on the picker-stick above the lug-strap.

It is not essential in all cases that the incline should be adjustable, or that it should be adjusted, in order to vary the force of the pick or the checking action. With the incline located at a given height on the picker-stick, any desired variation in the force of the pick may be secured by adjusting the length of the picking-arm in well-known manner; and any desired variation in the checking action may be secured by a proper adjustment of the tension of the heel-strap spring. By having the heel-strap spring under considerable tension it will assist the shuttle in moving the incline outward under the contact-piece carried by the lug-strap, and consequently the checking action will be diminished. By slackening up the heel-strap spring the reverse results will be secured and the checking action will be increased.

Fig. 29, Sheet 4, shows a construction in which the incline is part of a casting 61ᵃ formed at 70 to partly (or wholly) embrace the picker-stick, and with a stem 71 which lies along the inner edge of the picker-stick, the lower portion of such stem being received within the socket-portion 51ᵃ of the rocker or shoe, and being clamped between such socket-portion and the picker-stick, as by means of the screw 5ᵈ. The said stem is adjustably held, so that the height of the incline may be varied as required.

Fig. 30, Sheet 4, shows a construction resembling that of Fig. 29 in that the incline and its collar for encircling the picker-stick are formed by casting, but differing therefrom in having, instead of the long stem 71 of Fig. 29, a comparatively short lug 72, the said lug being engaged by the upper portion of the tongue 8, which overlies the said lug. To prevent accidental displacement of the incline-piece vertically upon the picker-stick, the lug is furnished with a V-shaped projection, and the upper portion of the tongue is correspondingly notched to receive the said projection. A plurality of notches in the tongue provides for vertical shift or adjustment of the incline. In Fig. 30, a fastening-screw 73 is shown passing through the upper portion of the socket 52ª, the picking-stick, and the upper portion of the tongue 8, but this screw may be omitted.

Fig. 31, Sheet 4, shows a construction in which a strip of metal is bent into an open triangular form, as at 74, the top of which constitutes the incline. The extremities of the strip are brought together, with flat surfaces thereof in contact with each other, such extremities together forming the stem of the incline-piece, and being clamped between the upper portion of the clamp-plate 51ᵇ and the outer edge of the picker-stick. At 65 is a collar like that of Figs. 1, 27 and 28, encircling the stem of the incline-piece and binding the incline-piece firmly in place against the outer edge of the picker-stick, and at 68 is a block of leather between the said stem and the said edge of the picker-stick to absorb the vibrations of the stem. The said Fig. 31 shows a stop for preventing the outer end of the lug-strap from lifting, comprising a stirrup 75 passing over the top of the cushion or pad 32 in the outer loop 23 of the lug-strap, and down outside the side-portions of the said loop, and fastened by the bolt 33 and nut 34 which secure the said cushion or pad in place, and a pin or projection 76 carried by the lower portions of the said stirrup and passing through the opening of the triangular portion of the incline-piece. Any tendency of the lug-strap to rise will be prevented by engagement of the said pin or projection with the under side of the top portion of the said incline-piece. The stirrup might be replaced by a single arm, and a similar stop might be employed in the case of the construction shown in Fig. 1, and be arranged to coöperate with the laterally-projecting webs of the cam-pieces of Figs. 29 and 30.

In some cases, the contact-piece which co-acts with the incline may be applied to an intermediate portion of the length of the lug-strap. An instance is shown in Fig. 32, Sheet 4, in which the contact-piece 32ª, composed preferably of a piece of leather, vulcanized fiber, or the like, is fastened by the bolt 28 and nut 29 of the clamping devices which join together the two loops of the lug-strap. The construction otherwise is similar to that of Fig. 30, save that the incline extends upward and inward at the inner edge of the picker-stick, and the incline-piece, 61ᵇ, is formed with a horizontal surface 77, on which said contact-piece rests to support the lug-strap when the latter occupies its normal position. A wedge 78 is shown driven down between the outer part of the collar of the incline-piece and the outer edge of the picker-stick, to tighten the said collar upon the picker-stick. This wedge may be used in connection with the other constructions when the collar does not fit upon the picker-stick as tightly as it should.

The incline-piece may be attached directly to the picker-stick itself. An instance of this attachment is shown in Figs. 33, 34 and 35, Sheet 5. In the construction of these figures the incline-piece 61ᶜ is mounted upon the picker-stick by means of a metal strap 79, which embraces the picker-stick, the free ends or ears of such strap being extended at the opposite sides of the heel-portion of the incline-piece. A bolt 80 passes through holes in the said free ends or ears and in the said heel-portion between them, the threaded portion of the bolt having a nut 81 applied thereto. A doubled strip of leather, or other suitable material, marked 82, is placed between the outer edge of the picker-stick and the heel of the incline-piece, to obviate injury to the said edge. A wedge 83 inserted inside the metal strap at the inner edge of the picker-stick serves to secure a tight fit of the strap, etc., upon the picker-stick. The surface of the heel which is turned toward the picker-stick is eccentrically formed, as shown in Fig. 34, so that any tendency of the outer end of the incline-piece to sink will carry the larger portion of the eccentric around toward the picker-stick, the effect of which will be to strain the strap more tightly around the picker-stick. Hence if the strap is properly fitted to the picker-stick the outer portion of the cam-piece cannot become depressed so as to improperly incline the working surface thereof. At the time of slipping the collar and incline-piece down into place upon the picker-stick, the outer end of the incline-piece is turned upward so as to present the portion of least projection of the heel portion to the picker-stick. When they have reached the proper place in the height of the picker-stick, the said outer end is turned down into proper working position. This will cause the eccentricity of the heel-portion to act to draw the collar tightly against the picker-stick.

In Fig. 36, Sheet 5, the stem of the incline-piece 61ª is clamped between the outer edge of the picker-stick and the clamp-piece 5ᵇ for the foot-end of the picker-stick, the collar 65 and leather block 68 being the same as in the case of constructions which have been described. The incline-piece and its stem are formed of a strip or bar which is bent to the required shape to form the stem, the incline which coacts with the contact-piece of the lug-strap, and a horizontal surface 77ª for supporting the outer end of the lug-strap when the picker-stick occupies its normal position.

In the different forms of the checking arrangement the weight of the lug-strap will be proportioned to secure the required checking action, and for an increase in the checking action the weight of the lug-strap may be increased. This mode of insuring the required checking efficiency is best for looms running at moderate or low speed. In the case of high speed looms the use of a heavy lug-strap has certain practical objections. With high-speed looms a spring may be employed to draw the lug-strap downward. This is illustrated in Fig. 36, in which the contracting spiral spring 84 has its upper end engaged with an eye 85 in connection with the clamping devices by which the loops of the lug-strap are joined together, and its lower end engaged with a link 86 which is fastened by screw 5$^d$ to the socket 5$^a$ of the rocker or shoe. Other forms and arrangements of springs may be employed.

The incline-piece may in some cases be supported by the rocker-bed 6, as in Fig. 37, Sheet 5, in which the incline-piece 61$^e$ is at the upper end of an arm 61$^f$ having its lower end fastened to the rocker-bed by a screw 61$^g$, nut 61$^h$, and washer 61$^i$. The said lower end is slotted vertically, at 61$^k$, to provide for vertical adjustment of the incline-piece. In this construction the incline-piece does not swing with the picker-stick. The contact-piece which is carried by the lug-strap for coöperation with the incline is constituted by a disk or washer 32$^e$ on the bolt 33 which holds the cushion or pad 32 inside the outer loop of the lug-strap. The said disk or washer is shown clamped against one outer side of the said loop by the nut 34 on said bolt. In the swinging movement of the picker-stick the said disk or washer travels along the incline. The incline-piece is formed with an inwardly projecting extension 61$^m$ along the upper edge of which the disk or washer travels when the lug-strap is moved inwardly for the pick, the said edge being shaped to support the lug-strap at approximately the same point in the height of the picker-stick throughout the sweep of the latter. The incline-piece 61$^e$ preferably is yoke-shaped so as to extend around at the rear as well as the front of the picker-stick, and a second washer or disk is mounted upon the bolt 33 at the rear side of the lug-strap.

In this construction of Fig. 37, in the normal position of the picker-stick, lug strap, etc., the disk or washer 32$^e$ carried by the lug-strap occupies a position low down on the incline, with the cushion or pad which occupies the outer loop of the lug-strap close to the picker-stick. When the shuttle enters the shuttle-box and drives the picker-stick ahead of it, the engagement of the stick with the cushion or pad carries the lug-strap outward, causing the disk or washer to travel up the incline, whereby the required checking action is brought about.

I claim as my invention:—

1. The improved lug-strap comprising opposite loops disposed in planes at right angles to each other, and clamp-members receiving on four sides thereof the said free ends and coupling the loops together.

2. The improved lug-strap comprising opposite loops disposed in planes at right angles to each other, clamp-members receiving between them the ends of one of said loops, and means for clamping the ends of the other loop to the backs of the said clamp-members and closing the latter together upon the ends first named.

3. The improved lug-strap comprising opposite loops of strip-material disposed in planes at right angles to each other, a pair of clamp-members clasping the ends of one of the said loops edgewise, and means for securing the ends of the other loop flatwise to the said clamp-members and for holding the latter together.

4. The improved lug-strap comprising opposite loops of strip-material disposed in planes at right angles to each other with their free ends juxtaposed, and clamping devices holding the ends of one of the said loops edgewise and those of the other loop flatwise.

5. The improved lug-strap comprising opposite loops of strip-material disposed in planes at right angles to each other, a pair of clamp-members receiving the ends of one of the said loops edgewise between them, and a bolt holding the ends of the other loop flatwise to the said clamp-members and clasping the latter against said edges.

6. The improved lug-strap comprising opposite loops of strip-material disposed in planes at right angles to each other, a pair of grooved clamp-members receiving the ends of one of the said loops edgewise between them, and receiving the ends of the other loop flatwise in their grooves, and a bolt securing the latter ends in said grooves and clasping the clamp-members against the edges of the ends first named.

7. The improved lug-strap comprising opposite loops disposed in planes at right angles to each other, a pair of clamp-members receiving between them the ends of one of said loops, washers between which and the clamp-members the ends of the other loop are received, and a bolt by which the washers are caused to clamp the latter ends against the clamp-members, and by which, also, the clamp-members are caused to clamp between them the ends first named.

8. The improved lug-strap comprising opposite loops disposed in planes at right angles to each other, a pair of clamp-members receiving the ends of one loop between them, the said clamp-members having interengaging lugs guiding the members in their approach to each other and preventing relative displacement, and means for securing the ends of the other loop to the clamp-members and pressing the latter together upon the interposed ends.

9. The combination with a lug-strap having a loop for embracing the picker-stick of a loom, of a loop-picker solidly packed in the bend or bight of said loop and constituting a cushion or pad for contact with the picker-stick with the striking face of said picker presented toward the picker-stick, a plug filling the eye of the loop of the said picker and rendering the latter solid, and a securing bolt passing through the sides of the lug-strap loop, the picker-loop, and the plug.

10. In a lug-strap for looms, in combination, opposite loops disposed in planes at right angles to each other, and clamping means engaging with the juxtaposed ends of said loops one of said loops having free ends thereof projecting beyond the clamping means, with one of such ends bent across the other thereof and concealing the latter.

11. In a loom, the combination with a lug-strap having an inwardly-extending loop, of a picking-arm constructed with a socket or holder, and a cushion inclosed in said socket or holder loosely encircled by said loop contacting with the bend or bight of the loop to transmit movement to the lug-strap when the picking-arm is actuated.

12. In a loom, the combination with a picking-arm constructed with a socket or holder having a fixed wall and a detachable wall, of a cushion or pad held between such walls and adapted to contact with the lug-strap to transmit movement to the latter when the picking-arm is actuated.

13. In a loom, the combination with a picking-arm provided with a cushion or pad and having an opening adjacent the latter, of a lug-strap having a loop which encircles the cushion or pad and one side of which occupies the said opening.

14. In a loom, the combination with a picking-arm provided with a cushion or pad, of a lug-strap engaging with said cushion or pad, the said picking-arm having a solid backing for the cushion or pad which sustains the latter in transmitting movement to the lug-strap when the picking movement of the picking-arm takes place.

15. In a loom, the combination with a picking-arm having a socket, of a cushion or pad occupying said socket and having a hole therein, the socketed portion of the picking-arm having a piece which enters the said hole and prevents displacement of the cushion or pad.

16. In a loom, in combination, a lug-strap having a loop, a picking-arm having a separable socket or holder, and a cushion or pad occupying said socket or holder and encircled by the said loop, transmitting motion to the lug-strap from the picking-arm when the latter is actuated for picking, and normally supporting the said loop.

17. In shuttle-checking devices for looms, in combination, a picker-stick, a lug-strap, and a device through which the vertically-acting weight of the lug-strap opposes the shuttle-imparted outward movement of the picker-stick.

18. In shuttle-checking devices for looms, in combination, a picker-stick, a lug-strap, and a device through which the energy of the shuttle is absorbed in the work of lifting the lug-strap.

19. In shuttle-checking devices for looms, in combination, a picker-stick, a lug-strap, and a device for opposing the shuttle-imparted outward movement of the picker-stick by friction due to the weight of the lug-strap.

20. In shuttle-checking devices for looms, in combination, a picker-stick, a lug-strap, and a device for absorbing the energy of the shuttle by combining the work of lifting the lug-strap with friction opposing the shuttle-imparted movement of the picker-stick.

21. In shuttle-checking devices for looms, in combination, a picker-stick, a lug-strap, and an incline-member and a contact-piece, one thereof attached to the lug-strap and resting on the other, relative movement lengthwise of the incline member creating resistance to the shuttle-imparted movement of the picker-stick.

22. In shuttle-checking devices for looms, in combination, a picker-stick, a lug-strap and a contact-piece and an incline-member, one thereof moving with the picker-stick and the other connected with the lug-strap, the weight of the lug-strap holding them in contact and shuttle-imparted movement of the picker-stick producing relative movement of the incline member and contact-piece lengthwise of the former.

23. In shuttle-checking devices for looms, in combination, a picker-stick, a lug-strap, one thereof having a lug-strap lifting incline member in connection therewith and the other having a contact-piece in connection therewith, and means to prevent jumping of the lug-strap.

24. In shuttle-checking devices for looms, in combination, a picker-stick, a lug-strap, a contact-piece in connection with said lug-strap, and a combined lug-strap holder and lifting incline-member in connection with the picker-stick.

25. In shuttle-checking devices for looms, in combination, a picker-stick and a lug-strap, one thereof having a lug-strap lifting incline member in connection therewith and the other having a contact-piece in connection therewith, and a spring operating with a tendency to hold said contact-piece and incline member in engagement with each other.

26. In shuttle-checking devices for looms, the combination with a picker-stick, of a lug-strap, and a lug-strap holder, one thereof having a contact-piece and the other thereof having a lug-strap lifting incline coacting with said contact piece, and means to adjust said holder to regulate the force of the pick.

In testimony whereof I affix my signature in presence of two witnesses.

CHARLES A. LITTLEFIELD.

Witnesses:
CHAS. F. RANDALL,
NATHAN B. DAY.